United States Patent [19]

Chronis

[11] 4,232,801
[45] Nov. 11, 1980

[54] PORTION CONTROL DRESSING AND FOOD DISPENSER

[76] Inventor: George C. Chronis, 1309 Anaconda SW., Albuquerque, N. Mex. 87105

[21] Appl. No.: 104,124

[22] Filed: Dec. 17, 1979

Related U.S. Application Data

[63] Continuation of Ser. No. 50,811, Aug. 21, 1978, abandoned.

[51] Int. Cl.³ .............................................. B67D 5/42
[52] U.S. Cl. ..................................... 222/43; 222/235; 222/309; 222/383; 222/409; 417/900
[58] Field of Search ................. 222/42, 44, 235, 309, 222/325, 340, 341, 380, 383, 409, 509, 518, 556; 417/484, 900

[56] References Cited

U.S. PATENT DOCUMENTS

| | | | |
|---|---|---|---|
| 1,081,817 | 12/1913 | Deming | 222/309 X |
| 1,283,457 | 11/1918 | Bates | 222/383 X |
| 1,336,187 | 4/1920 | Barr | 222/383 |
| 2,252,150 | 11/1941 | Whitfield | 222/235 X |
| 2,373,171 | 4/1945 | Daly | 222/325 X |
| 2,650,744 | 9/1953 | Dirksen | 222/383 |
| 2,988,248 | 6/1961 | Bender et al. | 222/309 X |
| 4,169,544 | 10/1979 | Blanchet | 222/340 X |

*Primary Examiner*—Robert J. Spar
*Assistant Examiner*—Fred A. Silverberg
*Attorney, Agent, or Firm*—Walter R. Keller

[57] ABSTRACT

A dressing and food dispenser which is adjustable for quantity of portion dispensed, useable with hot or cold thermos dressing and food containers which may be equipped with agitators; utilizing dual rack gears to first apportion then dispense.

2 Claims, 4 Drawing Figures

PORTION CONTROL DRESSING AND FOOD DISPENSER

This is a continuation of application Ser. No. 050,811 filed Aug. 21, 1978, now abandoned, which is related to Ser. No. 873,672, now abandoned.

SUMMARY

This invention is designed to eliminate waste, and spillage of salad dressing, gravy and other essentially liquid or creamy type condiments and foods, yet allow passage of chunky type dressings such as blue cheese dressing or tarter sauce. It is an object of this invention to minimize waste and spillage thus enhancing sanitary conditions in public eating places such as restaurants and fast food establishments. It is further an object of this invention to provide a means of controlling the amount of condiments discharged in each operation of the invention. It is a further object of this invention that it be hand operated thus conserving energy, yet being simple and easy to operate. An additional object of this invention is that the invention be easy to assemble and dissassemble for ease of cleaning and sanitizing. Another object of the invention is to provide a means whereby the condiments the protected from dirt, dust, flying glass, flies, human contamination, and the condiments container can easily be removed and refrigerated for longer time of preserving the condiments before use.

DESCRIPTION OF THE PRIOR ART

1. Field of the Invention

This invention relates to dispensing apparatus; and more particularly to a device for dispensing a predetermined quantity of liquid or semi-liquid foods, food dressings, and condiments.

2. Description of Prior Art

Commonly condiments are dispensed with laddles which results in spillage, dripping, and generally unsanitary conditions. Plastic squeeze bottles are frequently used for those condiments that are relatively homogeneous in texture, yet the squeeze bottles are subject to plugging up, or uncontrolled squirting. Probably, the most well known, type dispenser of liquids is the plunger type soap dispenser. Typical of these types of dispenser is BATES, U.S. Pat. No. 1,283,457. BATES teaches a dispenser which dispenses soap through the plunger, each operation dispensing a predetermined, but not controllable or adjustable amount.

DESCRIPTION OF THE PREFERRED EMBODIMENT

Figure 1:
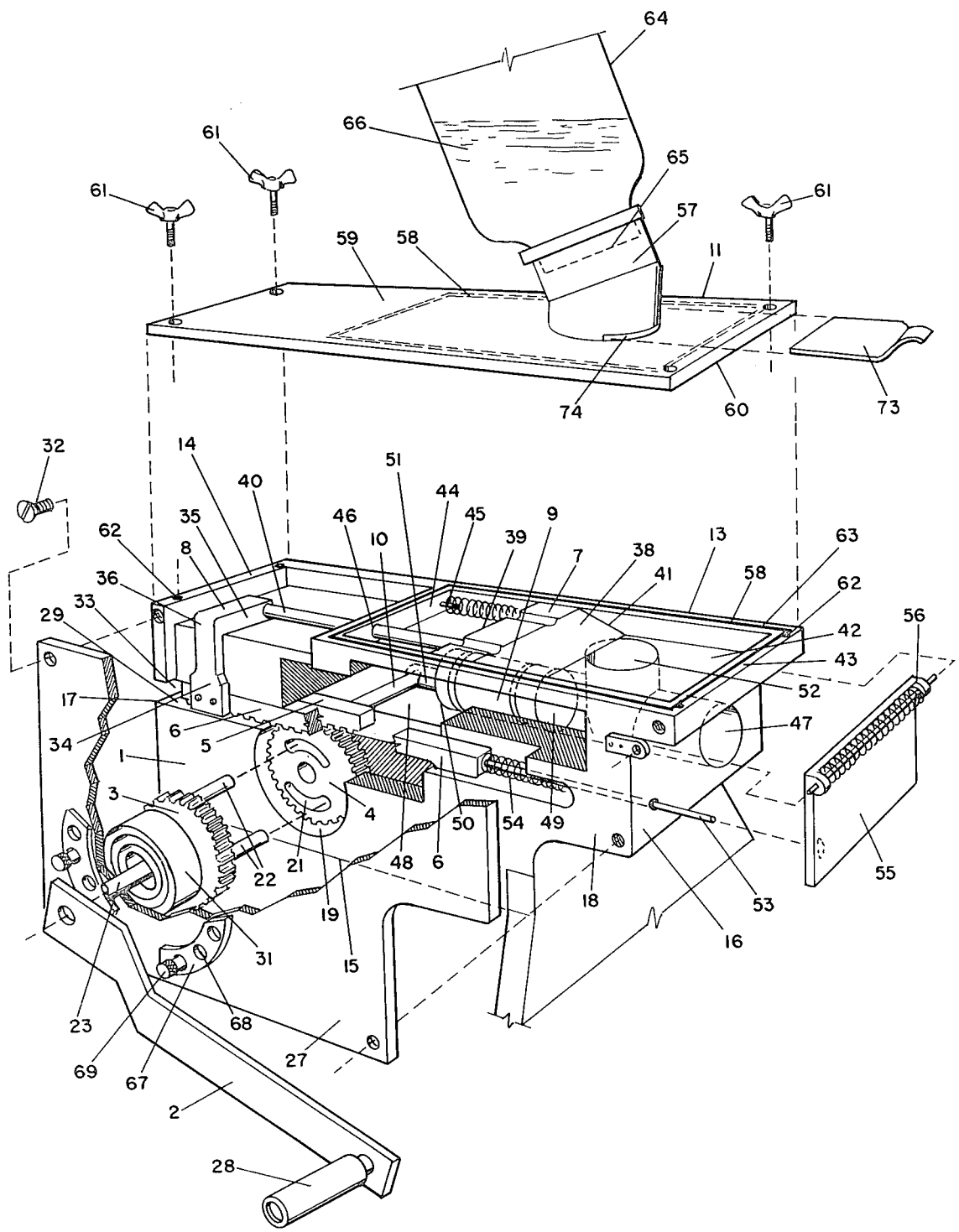
FIG. 1 is an exploded isometric view of the invention.

As shown in FIG. 1, the invention has a chassis 1, a handle 2, a driver gear 3, a follower gear 4, a piston rack gear 5, a dispensing rack gear 6, a slide valve 7, a valve arm 8, a piston 9, a piston crank 10, a container mount 11. The chassis 1 is generally rectangular prism in shape having a top 14, a bottom 15, a dispensing end 16, a butt end 17, a handle side 18, and a blank side 19. The chassis 1 may be made of metal or rigid plastic and may be machined from a solid block it may be built up; however, for simplicity of description it will be described as machined from a solid block. A cylindrical gear chamber 19 is bored perpendicular to the handle side 18 of sufficient diameter and depth to house the driver gear 3 and the follower gear 4 when assembled. In the center of the end of the gear chamber 19 on it cylindrical axis, is bored an axle bearing race (not shown). On an axle 23, the follower gear 4 is rotatable mounted, and may also have a bearing and bearing race to reduce friction or simply a sleeve bearing. The follower gear 4 is a standard round gear, having two driver slots 21 machined through the gear from face to face. The driver slots 21 are wide enough to accept driver pins 22, and the driver slots 21 are circularly disposed around the axis of the follower gear 4 extending approximately 120° in arc; each, opposing each other, thus leaving approximately sixty degrees of the gear solid metal between the ends of the driver slots 21. The driver gear 3 is a standard round gear, having two driver pins 22 mounted on the same face of the driver gear 3. The driver pins 22 are cylindrical rods mounted diametrically opposite each other and protruding perpendicular to the face of the driver gear 3. The driver pins 3 are of sufficient length and diameter to engage the driver slots 21 in the follower gear 4. The driver gear 3 is rigidly attached to the axle 23 as by a key, and slot arrangement (not shown) in the driver gear 3; axle 23 assembly. The driver gear 3 has a center bore through which the axle 23 extends, and the axle 23 when assembled, is rotatably inserted into the axle bearing race (not shown). The axle 23 is rotatably supported on the other end by another bearing race (not shown) mounted on a cover plate 27, and the axle 23 protrudes through the cover plate 27. Rigidly affixed to the axle 23 on the end protruding through the cover plate 27 is the handle 2. The handle 2 is a flat member conveniently curved with a rotatable grip 28 affixed in a standard fashion perpendicular to the plane of rotation of the handle 2. The cover plate 27 is rigidly affixed such as screws 32 to the chassis 1.

The chassis 1, has a dispensing rack gear channel 29 which is parallel to the bottom 15 of the chassis 1 and runs from the butt end 17 to the dispensing end 16. The dispensing rack gear channel 29 is disposed directly over the driver gear 3 and intersects the gear chamber 19 so that there is an opening between the gear chamber 19 and the dispensing rack gear channel 29. The dispensing rack gear channel 29 is essentially rectangular in crossection, having two rectangular slide shoulders 30 in the lower corners. The dispensing rack gear 6 slideably inserts into the dispensing rack gear channel 29. The dispensing rack gear 6 has an essentially rectangular crossection, and standard rack gear teeth on its lower side and two slide cut outs on its lower sides on each side of the gear teeth so that the dispensing rack gear 6 slideably mates with and into the dispensing rack gear channel 29, and the teeth of the dispensing rack gear 6 mateably engage the teeth on the driver gear 3. Parallel to and adjacent to the dispensing rack gear channel 29, the chassis 1 has a piston rack gear channel 31. The piston rack gear channel 31 is disposed over the follower gear 4, intersecting the gear chamber 19, thus forming an opening between the gear chamber 19 and the piston rack gear channel 31. The piston rack gear 5 also has standard rack gear teeth on its lower side, and cut outs on each side of the gear teeth which slideably mate with shoulders in the piston rack gear channel 31.

The piston rack gear 5 slideably mates with piston rack gear channel 31 and the teeth on the piston rack gear 5 engages and mate with the follower gear 4.

Rigidly affixed to the dispensing rack gear 6 is the valve arm 8. The dispensing rack gear channel 29 has an open slide slot 33 in which the valve arm 8 moves as the dispensing rack gear 6 moves. The open slide slot 33 connects the dispensing rack gear channel 29 to the outside of the length of the chassis 1. The valve arm 8 a generally channel shaped member having a rack flange 34 which attaches to the dispensing rack gear 6, and a valve flange 35 which attaches to a valve rod 36, and a web 37 connecting the valve flange 35 and the rack flange 34. The slide valve 7 is a flat rectangular slide member with a sloping beveled front edge 38, a rectangular butt end 39 and two sides 41 having a tongue 40 on each. The slide valve 7 operates in a valve chamber 42 in the top of the chassis 1. The valve chamber 42 is essentially a rectangular opening in the top of the chassis 1, having a lip 43 around. The valve chamber 42 is sized in width and depth to slideably accomodate the slide valve 7. The valve chamber 42 has a valve butt end 44. The valve butt end 44 has a helical spring stop 45 affixed rigidly to the lip 43 on the inside of the valve chamber 42. The valve butt end 44 also has a valve rod port 46. Rigidly affixed to the rectangular butt end 39 of the slide valve 7 is the valve rod 36 which is inserted into and slideably mates with the valve rod port 46. The valve rod 16 is on its other end rigidly affixed to the valve arm 8. Consequently, as the dispensing rack gear 6 moves so does the slide valve 7.

Affixed rigidly to the piston rack gear 5 is the piston crank 10. The piston crank 10 is mounted perpendicular to the side of the piston rack gear 5 protruding toward a piston cylinder 47 and away from the handle 2. In the chassis 1 there is a piston crank slot 48 which connects the piston rack gear channel 31 to the piston cylinder 47 approximately two thirds the length of the piston cylinder 47 beginning at the butt end 17. The piston cylinder 47 is a round bore through the chassis 1 from the butt end 17 to the dispensing end 16. The piston 9 is cylindrical in shape, sized to be slidably inserted into the piston cylinder 47 and operate therein. The piston 9 has a flat end 49 and a rod end 50 to which a piston rod 51 is rigidly attached. The piston rod 51 is a cylindrical rod like member whose diameter is smaller than that of the piston 9. The end of the piston rod 51 which is not attached to the piston 9 is rigidly attached at approximately a right angle to the piston crank 10. Thus as the piston rack gear 5 moves, so moves the piston 9.

Connecting the valve chamber 42 and the dispensing end of the piston cylinder 47 is a generally circular passage 52.

Attached to the dispensing end of the dispensing rack gear 6 is a push rod 53, which extends toward the dispensing end 16 of the chassis 1. Slideably installed over the push rod 53 is a helical coil return spring 54. The return spring 54 is rigidly affixed to the dispensing end 16 of the chassis 1 and abuts against the dispensing rack gear 6 so that when the dispensing rack gear 6 is moved toward the dispensing end 16 of the chassis 1, the return spring 54 is compressed.

Hinged at the top of the chassis 1 on the dispensing end 16 is a dispensing door 55. The dispensing door 55 is biased in a closed position, flush against the dispensing end by a spring loaded hinge 56 of known and standard construction.

The container mount 11 consists of a generally rectangular flat plate having in its upper surface 59 in the approximate middle a male threaded container adapter 57. The container mount 11 has a seal recess 58 around it periphery its lower surface 60.

The seal recess 58 is generally semi circular, sized to accept a resilient seal 63. The lip 43 of the valve chamber 42 also has a seal recess 58 identical to that in the container mount 11, and the container mount 11 is secured to the chassis 1 by screws 61 which thread mateably into taps 62, with the seal 63 made of resilient material in the seal recesses 58.

A container 64 with a threaded mouth 65 full of condiments 66 is then mateably screwed, on to the container adapter 57. Thus assembled, when the handle 2 is turned in a clockwise manner, the driver gear 3 turns and the dispensing rack gear 6 begins moving toward the dispensing end 16 of the chassis 1. Further turning of the handle 2 moves the dispensing rack gear 6 further toward the dispensing end 16 of the chassis 1 causing the push rod 53 to engage the dispensing door 55 causing it to begin to open and also to begin compressing the return spring 54. Simultaneously, the valve arm 8 is also moved toward the dispensing end 16 of the chassis 1 causing the slide valve 7 to close the opening in the container mount 11 stopping further discharge of condiments from the container 64, and also closing the passage 52 so condiments 66 in the piston cylinder 47 cannot escape into the valve chamber 42. As the handle 2 is further turned clockwise, the driver pins 22 will have completed their slide in the driver slots 21 and begin to bear on and turn the follower gear 4. The turning of the follower gear 4 causes the piston rack gear 5 to begin to move toward the dispensing end 16, thus causing the piston 9 to force the condiments 66 out of the dispensing end 16. The handle 2 having been turned the full arc, the return spring 54 is fully compressed. Releasing pressure on the handle 2 allows the return spring 54 to force the dispensing rack gear 6 toward the butt end 17 of the chassis 1, opening the slide valve 7 and allowing the dispensing hinged door 55 to close, and reversing the turn of the driver gear 3. When the driver gear 3 has turned in a counter clockwise direction sufficiently, the driver pins 22 will complete their reverse slide in the driver slots 21 thus engaging the follower gear 4, turning it counter clockwise. The piston rack gear 5 will then be moved toward the butt end 17 of the chassis 1 moving the piston 9 also toward the butt end 17. Since the dispensing hinged door 55 is closed, the moving of the piston 9 toward the butt end 17 causes a partial vacuum or suction in the piston cylinder 47, which will draw additional condiment 66 from the container 11 into the valve chamber 42, through the passage 52, loading the piston cylinder for the next operation of the invention.

In order to provide a means for adjusting the portion of condiment 66 discharged with each stroke of the piston 9, a graduated stop mount 67 is rigidly affixed to the chassis 1 adjacent to the desired position of the further most desired counterclockwise turn of the handle 2. The graduated stop mount 67 is generally flat and arcuate, having a plurality of taps 68 sized to accept a threaded stop bolt 69. The stop bolt 69 is threaded into one of the taps 68 so that the stop bolt 69 protrudes perpendicular to the handle side 18 of the chassis 1 thus stopping the handle 2 in it counterclockwise turn at the desired point, which in turn stops the travel of the piston 9, and limiting the space in the piston cylinder 47 and thus the amount of condiment 66 to be discharged.

Figure 2:
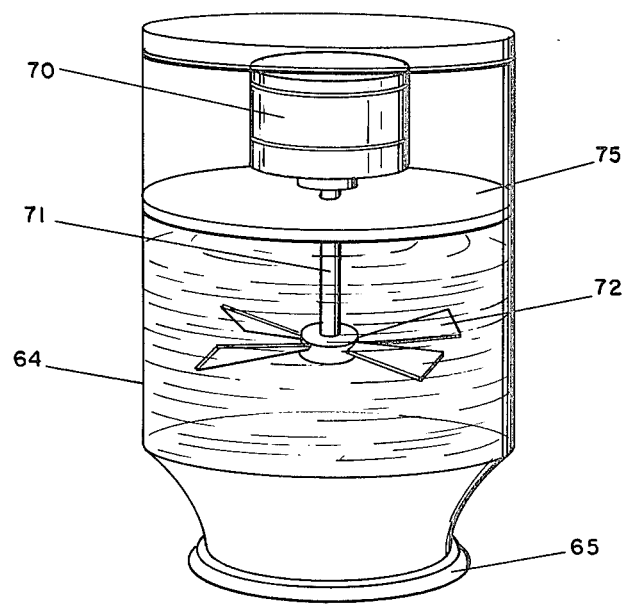
FIG. 2 is an isometric view of the container with agitator.

The container 11 can be of any sufficient size, and if hot or cold condiments 66 are to be dispensed. The container 11 can be a thermos type sealed vacuum container. In addition, some condiments 66 such as Italian Salad Dressing separate when standing. FIG. 2 shows a container 11 having a small electric slowspeed motor 70 in it base having an agitator blade 72 attached to the shaft 71 of the motor 70, and a seal 75 between the shaft and the inner bottom of the container 11. The electric motor 70 turns the agitator blade 72 thereby constantly agitating the condiments 66 preventing separation. A lid with a suitable seal, not shown, of standard and known construction can be installed on the container when not in use with the dispensing device so that the sealed container can be refrigerated or kept warm as the condiments require.

Figure 3:
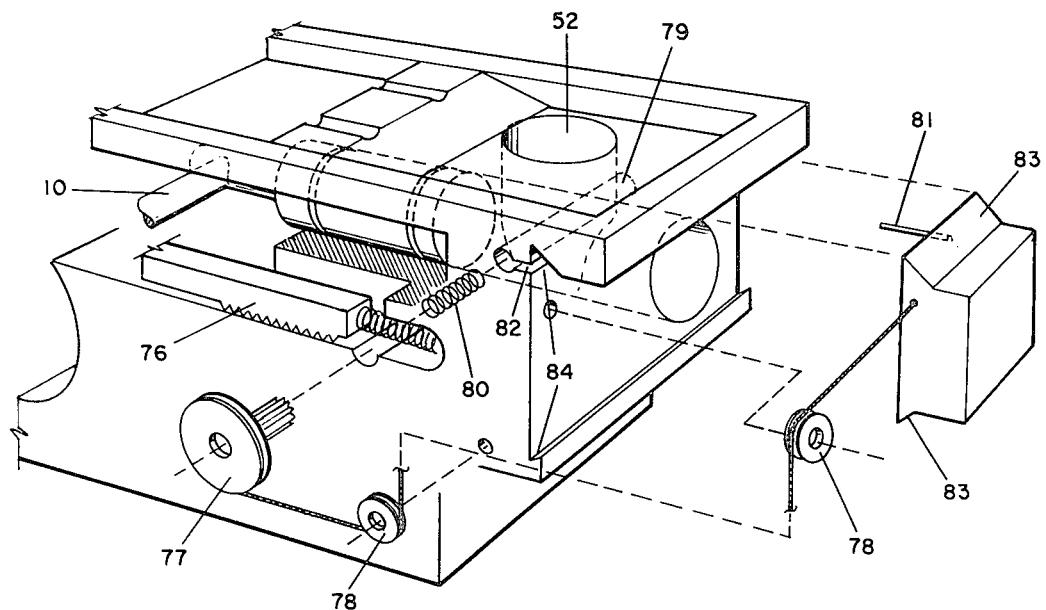
FIG. 3 is an exploded isometric view of the dispensing end showing a cable operated dispensing door.
Figure 4:
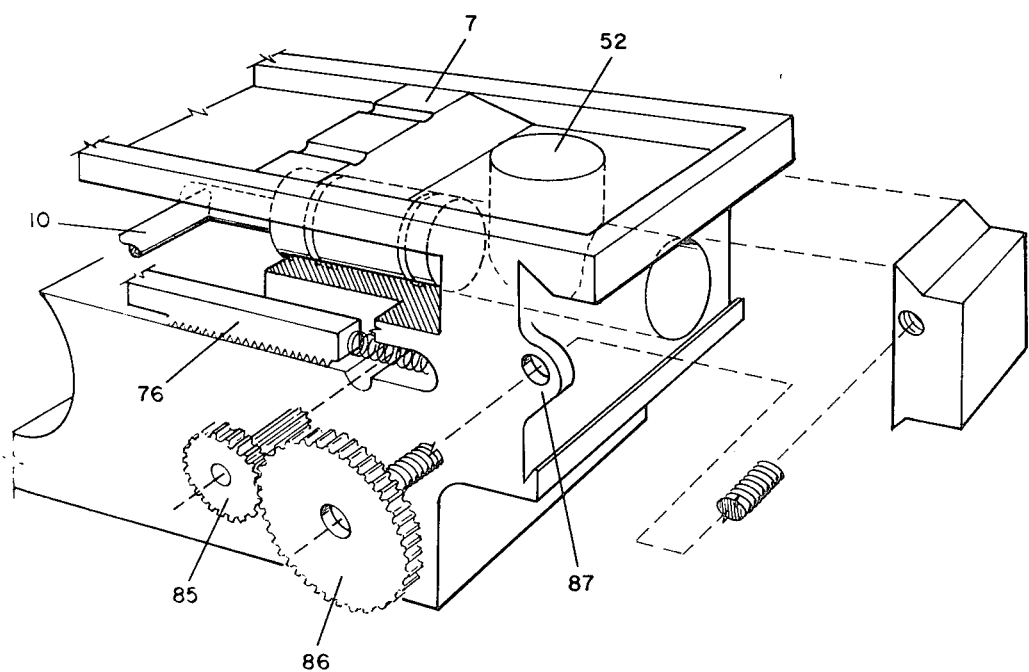
FIG. 4 is an exploded isometric view of the dispensing end showing a gear operated dispensing door.

While the hinged dispensing door 55 works satisfactorily with relatively liquid homogenous condiments 66, it will have a tendency to be struck open if used with chunky condiments 66 such as blue cheeze dressing, since chunks of the condiments 66 will become wedged between the dispensing door 55 and the dispensing end 16. FIGS. 3 and 4 depict different configurations wherein the dispensing door has lips 83 which slideably mate with slide slots 84 on the dispensing end allowing the dispensing door to slide across the piston cylinder. The sliding dispensing door configurations permit the door to slice off condiments which may have been only partially discharged; and thus eliminates the problem with the hinged dispensing door previously described.

FIG. 3 shows a cable driven means for actuating the sliding door to comprise door driver teeth 76 located on the dispensing end of the dispensing rack gear 6, a gear spool 77, two directional pulleys 78, a door return spring 80, and a spring compressor finger 81, and a door return spring receptacle 79 with a finger slot 82. The gear spool 77 has a shaft with gear teeth which engage the door driver teeth on the dispensing rack gear 6, and the gear spool 77 has a spool upon which a cable is wound. A cable is attached to the gear spool 77, routed around the two directional pulleys 78, which are rotatably mounted on the chassis 1, and thence attached to the sliding door. The two directional pulleys 78 are rotatably mounted to the chassis 1 in order to provide a proper direction to the cable force on the sliding door. The door return spring 80 a helical spring, is inserted into the door return spring receptacle 79 and retained therein by a cap not shown. The spring compressor finger 81 is rigidly affixed to the sliding door so that it slideably inserts into the finger slot 82 and engages the door return spring 80. Thus assembled, as the dispensing rack gear 6 is driven forward, the gear spool 77 is turned, winding up the cable and sliding the door toward the handle side 18, and the spring compressor finger 81 then compresses the door return spring 80. Upon release of the handle 2, the door return spring 80 closes the door, unwinding the cable from the gear spool 77.

FIG. 4 shows a gear-screw means for actuating the sliding door to comprise a rotary gear 85, a gear screw 86, and a gear screw retaining mount 87. The rotary gear 85 is rotatably mounted in the chassis 1 so that it is driven by the door driver teeth 76; and the rotary gear 85 in turn drives the gear screw 86. The gear screw 86 is rotatably mounted in the gear screw retaining mount 87 which is integrally formed on the dispensing end 16 of the chassis 1. The gear screw 87 screws in to a threaded hole in the door. Thus, as the dispensing rack gear 6 moves forward the gear screw 87 is turned and the sliding door is screwed to the open position. The helical return spring 54 returns the dispensing rack gear 6 thus closing the sliding door.

It is also obvious that the invention can be equipped with another handle for hand held operation, or secured to a wall, or mounted on a base to secure it to a table or counter, and these variations are contemplated by this invention. Furthermore, the invention as described is hand operated, for conserving energy; however, it is obvious that an electric motor could be used, with a simple control button, to turn the axle thus motorizing the invention.

I claim:

1. A portion control dressing and food dispenser device comprising:

a chassis having a dispensing end, a butt end, a handle side, a top and a bottom, a blank side; said chassis having a gear chamber perpendicular to the handle side, and a dispensing rack gear channel, from the butt end to the dispensing end, and a piston rack gear channel from the butt end to the dispensing end, and a cylindrical piston cylinder from the butt end to the dispensing end, and a valve chamber in the top of the chassis; wherein the dispensing rack gear channel intersects the gear chamber, and the piston rack gear channel intersects the gear chamber; and wherein the dispensing rack gear channel has a slot along its length providing access to the handle side of the chassis; and wherein the piston rack gear channel has a slot along apart of its length connection with and providing access to the piston cylinder; and wherein the chassis has a passage connecting the valve chamber with a piston cylinder near the dispensing end of the chassis;

a dispensing rack gear slideably inserts into the dispensing rack gear channel, a piston rack gear slideably inserts into the piston rack gear channel, an axle on which is rotatably mounted a follower gear, and on which is fixedly mounted a driver gear, said axle being rotatably mounted on the inside end of the gear chamber, wherein the follower gear engages and mates with the piston rack gear, and wherein the driver gear engages and mates with the dispensing rack gear;

a cover plate rotatably supports one end of the axle, the axle protruding through the cover plate;

a handle having a rotatable grip rigidly affixed to the end of the axle which protrudes through the cover plate;

a rectangular flat slide valve slideably mates into the valve chamber, said slide valve having a sloping front end and a flat butt end; wherein a valve rod is rigidly attached to and perpendicular to the flat end;

the valve chamber having a lip, said lip having a semicircular seal recess in its top and a helical spring stop rigidly affixed to the inside of the lip adjacent to the flat end of the slide valve, and said valve chamber having a valve rod port sized to slideably accept the valve rod;

a piston crank, generally rod like, is rigidly attached on one end to the piston rack gear, and rigidly affixed on the other end to the piston rod and slideably functions in the lengthwise slot along the piston rack gear channel;

a valve arm is rigidly affixed to the dispensing rack gear on one end, and rigidly affixed on the other end to the valve rod;

a helical return spring bears, when compressed, against the dispensing rack gear and the dispensing end of the dispensing rack gear channel;

a resilient seal;

a container mount having a threaded container adapter with a mouth for passage dressings or food from a container into the valve chamber, said container mount being generally flat and having a semi-circular seal recess sized and shaped to accept the resilient seal and to sealably mate with the seal recess in the lip of the valve chamber, said container mount being rigidly affixed to the top of the chassis over the valve chamber, with a resilient seal between the container mount and the chassis and the container mount secured to the chassis as by screws;

a dispensing door, and a means for opening and closing the dispensing door driven by the dispensing rack gear, the follower gear having a plurality of driver slots, said driver slots being circular arcs in shape having a width sufficient to slideably accept driver pins;

a plurality of driver pins being round rod like members, rigidly affixed to a face of the driver gear, of size and length to slideably insert in to the driver slots of the follower gear, a graduated stop mount having a plurality of taps, the stop mount being generally flat, circular arc in shape, rigidly affixed to the handle side of the chassis adjacent to the handle, a stop bolt threaded to screw into the taps in the stop mount, and a container, threaded at the mouth to screw mateably on to the container adapter, wherein by turning the handle, the driver gear moves the dispensing rack gear, closing the slide valve, opening the dispensing door, compressing the return spring and further turning of the handle causes the driver pins to engage the follower gear causing it to turn, the turning follower gear then moving the piston rack gear toward the dispensing end of the chassis causing the piston to discharge food or dressing in the cylinder; and wherein releasing the handle permits the compressed return spring to force the dispensing rack gear toward its starting position closing the dispensing door, and opening the slide valve; and further rearward travel of the dispensing rack gear causes the driver pins to slide in the driver slots until the driver pins re-engage the follower gear moving it toward its starting position thus retracting the piston causing a partial vacuum in the cylinder which causes food or dressing to move from the container into the valve chamber, through the passage into the cylinder; and wherein movement of the dispensing rack gear is stopped by the handle contacting the stop bolt; and wherein the invention is ready for the next turn of the handle.

2. The portion control dressing and food dispenser device of claim 1 wherein the dispensing door has lips on its top and bottom edge which slideably mate with slide slots on the dispensing end of the chassis so that the dispensing door slides transversly and wherein the means for opening and closing the dispensing door driven by the dispensing rack gear comprises a rotary gear rotatably mounted in the handle side of the chassis and which engages the door driven teeth on the dispensing rack gear; and a gear screw, the gear portion of which engages the rotary gear and the screw porton of which threadably mates with the dispensing door, and the gear screw being rotatably mounted in a gear screw retainer mount integrally formed with the chassis.

* * * * *